United States Patent [19]

Brown et al.

[11] Patent Number: 5,671,361
[45] Date of Patent: Sep. 23, 1997

[54] PRIORITY RULE SEARCH TECHNIQUE FOR RESOURCE CONSTRAINED PROJECT SCHEDULING

[75] Inventors: James T. Brown, Titusville; Robert L. Armacost, Cape Canaveral, both of Fla.

[73] Assignee: University of Central Florida, Orlando, Fla.

[21] Appl. No.: 535,457

[22] Filed: Sep. 28, 1995

[51] Int. Cl.$^6$ ................................................ G06F 7/00
[52] U.S. Cl. .................... 395/209; 395/207; 395/208; 395/211; 364/468
[58] Field of Search .............................. 364/401, 402, 364/468; 395/207, 208, 209, 211

[56] References Cited

U.S. PATENT DOCUMENTS

| | | | |
|---|---|---|---|
| 4,700,295 | 10/1987 | Katsof et al. | 364/401 |
| 4,700,318 | 10/1987 | Ockman | 364/518 |
| 5,040,123 | 8/1991 | Barber et al. | 364/468 |
| 5,093,794 | 3/1992 | Howie et al. | 364/468 |
| 5,111,391 | 5/1992 | Fields et al. | 364/401 |
| 5,117,353 | 5/1992 | Stipanovich et al. | 364/401 |
| 5,148,370 | 9/1992 | Litt et al. | 364/468 |
| 5,155,679 | 10/1992 | Jain et al. | 364/402 |
| 5,202,993 | 4/1993 | Tarsy et al. | 395/700 |
| 5,216,593 | 6/1993 | Dietrich et al. | 364/402 |
| 5,291,397 | 3/1994 | Powell | 364/402 |
| 5,406,476 | 4/1995 | Daziel, Jr. et al. | 364/402 |

*Primary Examiner*—Gail O. Hayes
*Assistant Examiner*—Gita Shingala
*Attorney, Agent, or Firm*—Brian S. Steinberger; Law Offices of Brian S. Steinberger

[57] ABSTRACT

A Priority Rule Search Technique (PRST) heuristic computer controlled algorithm is disclosed that schedules single project, single resource and multiple project, multiple resource constrained project scheduling problems. Primary areas of utility include construction, manufacturing and research and development projects. The invention can schedule tasks/activities for large scale, multiple resource and multiple project networks that have different network and resource constraint characteristics while providing balance among different project network characteristics in order to provide an effective solution for a variety of network types. The novel PRST algorithm combines four heuristic rules (ACTM, LFT, MGRD and MACTRES) to determine a priority value for each job task/activity. The priority values are ranked to determine an optimum schedule of all job tasks and activities to complete the entire project. The invention incorporates the time (ACTM and LFT) and resource (MGRD and MACTRES) characteristics of project activities into a priority rule based search heuristic to determine an activity's priority for scheduling. The PRST scheduling invention is composed of four priority rules that are individually weighted and combined. The first two priority rules are ACTIM and Late Finish Time (LFT) heuristics. The second two priority rules allow for the allocating of limited resources to activities that cannot be scheduled concurrently. One of these priority rules designated Multiple Greatest Resource Demand (MGRD) modifies a Greatest Resource Demand heuristic to accommodate a multiple resource case. MGRD is scaled measure of the resource demanded for each activity. The second priority rule is designated Multiple ACTRESS (MACTRES) which modifies a ACTRES heuristic to accommodate the multiple resource case. MACTRES is a measure of the time and resources controlled by the activity through the network. Alternatively, the schedule of each of the job tasks/activities can be scheduled by ranking priority values based separately on MACTRES computations or MGRD calculations.

12 Claims, 4 Drawing Sheets

5,671,361

PRIORITY RULE SEARCH TECHNIQUE FOR RESOURCE CONSTRAINED PROJECT SCHEDULING

This invention relates to project scheduling and production methods and more specifically to a priority rule based heuristic algorithm for the efficient scheduling of single and multiple projects with single or multiple resource requirements.

BACKGROUND AND PRIOR ART

Large scale commercial construction projects and manufacturing projects typically require multiple resources needed to perform jobs that compose single or multiple projects. Thus, each of the jobs that compose these projects must be scheduled. A project can generally be defined as a nonrepetitive group of activities that are undertaken to accomplish an objective within a specific time limit and cost budget. Effective project management involves the balancing of activities and their budgets. Construction and high technology manufacturing projects typically pay significant bonuses for the early completion of a project. Likewise, construction and high technology manufacturing projects have penalties for a late finish. Generally, commercial construction and high technology projects are started based on bids. Thus, a shorter duration schedule by one bidder can be a tremendous competitive advantage over other bidders. Further, the entire time needed to finish a project can allow for a quicker entry into the market place by a manufacturer. Additionally, shorter duration schedules help minimize the risks of completing an expensive project by reducing the overall costs given today's high overhead cost for project development.

Typical amounts of scheduling solution time for a large construction and high technology project increase exponentionally with the size of the project due to many factors, of which the scheduling of individual job tasks with resource requirements is a paramount problem. The solution has been typically subject to the constraint that each job be scheduled for completion at or before some prescribed due time or as short a time after the due time is possible. Known practical solution methods generally fall into two categories, one category employing pure search techniques, e.g. branch-and-bound, and the other category using heuristic rules. The techniques in both categories are adapted for use on digital type computers. In spite of the effort to minimize the amount of computation, the known optimal search techniques suffer from excessive demands on computer time.

As to approaches using heuristic rules, most such approaches in the an are of the time-progression type where the solution schedule is generated step-by-step. At each step in the solution process, a queue of jobs waits to be initiated. The choice of which job to initiate next at each machine is based on heuristic rules, e.g. choose the job with the closest due time. While such heuristic approaches require less computing time as compared to the optimal search techniques, they fail to provide good schedules. One reason for the failure of such approaches is their failure to account for multiple resource requirements and to anticipate future bottlenecks. Examples of prior art systems having these problems includes U.S. Pat. Nos. 4,700,318; 4,896,269; 5,040,123; and 5,148,370. Existing Commercial Off The Shelf (COTS) Project software such as Microsoft Project and Artemis cannot be used with multiple project and multiple resource constraints on the project that needs scheduling.

SUMMARY OF THE INVENTION

The first objective of the present invention is to provide an algorithm for scheduling a plurality of projects each comprising multiple jobs or tasks.

The second object of this invention is to provide an algorithm that minimizes time duration project schedule for a sequence of job tasks.

The third object of this invention is to provide a project scheduling algorithm that looks ahead in time to anticipate and avoid infeasible schedules.

The fourth object of this invention is to provide a project scheduling heuristic that exploits the time and resource characteristics of project networks through the use of a priority rule based search technique.

The fifth object of this invention is to provide a scheduling algorithm for single resource requirements.

The sixth object of this invention is to provide a scheduling algorithm for multiple resource requirements.

The invention is a Priority Rule Search Technique (PRST) heuristic computer controlled algorithm that schedules single or multiple projects with single or multiple resource constraints. The invention incorporates the time and resource characteristics of project activities into a priority rule based search heuristic to determine an activity's priority for scheduling. Primary areas of utility include construction, manufacturing and research and development projects. The invention can schedule tasks/activities for large scale, multiple resource and multiple project networks that have different network and resource constraint characteristics while providing balance among different project network characteristics in order to provide an effective solution for a variety of network types. The invention incorporates the time and resource characteristics of project activities into a priority rule based search heuristic to determine an activity's priority for scheduling. The PRST scheduling invention is composed of four priority rules that are individually weighted and combined by an equal interval search technique. The first two priority rules are ACTIM and Late Finish Time (LFT) heuristics. The second two priority rules allows for the allocating of limited resources to activities that cannot be scheduled concurrently. One of these priority rules designated Multiple Greatest Resource Demand (MGRD) modifies a Greatest Resource Demand heuristic to accommodate a multiple resource case. MGRD is a scaled measure of the resource demanded for each activity. The second priority rule is designated Multiple ACTRES (MACTRES) which modifies an ACTRES heuristic to accommodate the multiple resource case. MACTRES is a measure of the time and resources controlled by the activity through the network.

Further objects and advantages of this invention will be apparent from the following detailed description of a presently preferred embodiment which is illustrated schematically in the accompanying drawings.

DESCRIPTION OF THE PREFERRED EMBODIMENT

Figure 1A:
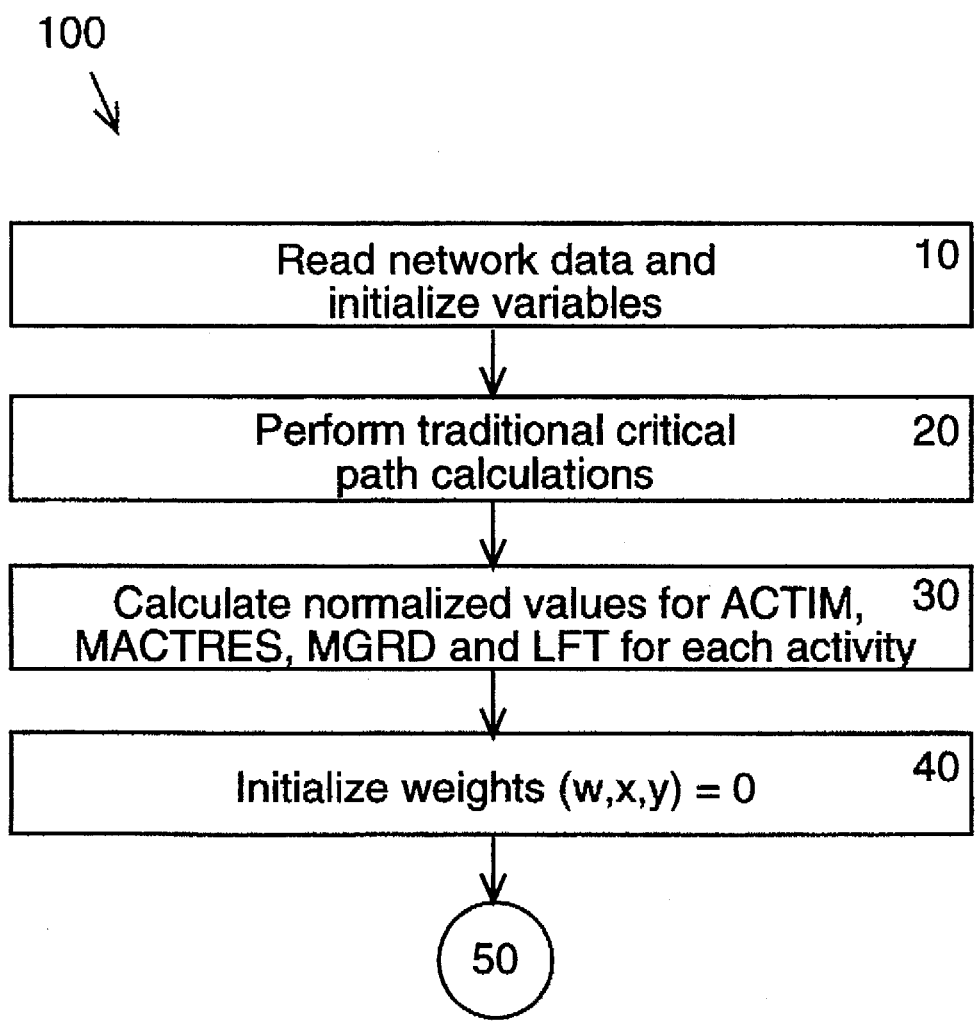
FIG. 1A is the first half of a flowchart on the PRST project scheduling algorithm invention.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

This PRST scheduling invention can be used in an algorithm form where priority rule values are determined for each activity and task that compose a project. The algorithm can be utilized by personal computers, workstations or mainframe computer systems such as but not limited to an IBM compatible 486, and the like. The methodology for implementation for any priority rule based heuristic scheduling method can be summarized as follows:

1. Solve a project network using the critical path method (chart the minimum tasks/activities sequential completion order (FIG. 3)) while tracking required completion times and resources for each activity and task.
2. Determine the priority rule values for each activity and task.
3. Rank the activities/tasks in order of the priority rule value.
4. Schedule the activities/tasks in priority order while maintaining the precedence relationships for the project network and satisfying resource constraints.

Priority rule values in the subject invention are determined by the novel PRST scheduling invention. The PRST scheduling invention is composed of four priority rules that are combined through an equal interval search technique. The first two priority rules are ACTIM and Late Finish Time (LFT) heuristics. The second two priority rules allow for the allocating of limited resources to activities that cannot be scheduled concurrently. One of these priority rules designated Multiple Greatest Resource Demand (MGRD) modifies a Greatest Resource Demand heuristic to accommodate a multiple resource case. MGRD is a scaled measure of the resource demanded for each activity. A second priority rule is designated Multiple ACTRES (MACTRES) which modifies a ACTRES heuristic to accommodate the multiple resource case. MACTRES is a measure of the time and resources controlled by the activity through the network. The four priority rules are combined through an equal interval search technique by linear weighting. The PRST priority value is computed as follows:

$$PRST = w[x\ ACTIM) + (1-x)(MACTRES)] + (1-w)[y(MGRD) + (1-y)(LFT)]$$

A description of the four priority rules will be followed by a preferred embodiment showing the flowchart for the PRST heuristic.

I. ACTIM.

ACTIM is the Critical Path Time minus the Latest Start Time of an activity. Thus, ACTIM is the maximum time each activity controls through a network on any one path. The critical path time and late start time for each activity are computed through application of the critical path method to the project network. Each job or activity would have an ACTIM value computed. The PRST algorithm utilizes this ACTIM value to help establish priorities among activities for scheduling purposes.

II. Late Finish Time (LFT).

Under LFT, priority is given to activities with the lowest value of late finish time. LFT is computed through application of the critical path method to the project network. Each job or activity would have a LFT value computed. The PRST algorithm utilizes this LFT value to help establish priorities among activities for scheduling purposes.

III. Multiple Greatest Resource Demand (MGRD).

MGRD modifies a Greatest Resource Demand (GRD) heuristic to accommodate a multiple resource case. MGRD is a scaled measure of the resource demanded for each activity. The GRD heuristic is computed by totaling all of the resource requirements for each activity. Each job or activity would have a GRD value computed. For MGRD, the GRD priority rule is modified specifically for the multiple resource case in two ways. The first modification consists of scaling the resource requirements. The scaling consists of assigning the maximum resources available for a resource type a value of 100 and then each resource requirement of that type for a given activity is appropriately scaled as a percentage of the maximum amount of available resources. For example, if a project had 10 units available for resource type B and activity one required nine units of resource type B, then its scaled resource consumption value would be 90. This feature is important because resource consumption levels among different resource types cannot be directly equated in a multiple resource project.

Note that even with appropriate scaling, the modified GRD only considers the total demand for resources. For example, if activity A required six units of resource from a single resource type, activity B requires two units of resource from three different resource types and activity C required one unit of resource from six different resource types, then all of the activities would have the same GRD value. It was hypothesized and proven that as the number of different resource types required by an activity requires increases, the greater will be the need to schedule that activity earlier. To reflect this priority, the modified GRD for each activity is multiplied by a resource type complexity factor designed as gamma ($\gamma$) prior to normalizing on a 0 to 100 scale over all activities. Gamma is assigned to be a non-decrementing function of the number of resource types. The resulting priority rule is designated as MGRD. In the example, the use of an increasing complexity factor $\gamma$ would give additional priority to activity B and C in the scheduling sequence. Activity C would be ranked first, activity B second and activity A would be ranked third although all the activities require six total units of resource.

Each job or activity would have a MGRD value computed. The PRST algorithm utilizes this MGRD value to help establish priorities among activities for scheduling purposes.

IV. Multiple ACTRES (MACTRES).

MACTRES is a modification of the ACTRES priority role. ACTRES is computed by multiplying the activity duration by the number of resource units for that activity and then adding the maximum of the ACTRES values following that activity in the project network. Each job or activity would have a ACTRES value computed. ACNES is modified to incorporate multiple resource types by use of scaling in the same manner that MGRD accounts for multiple resources. The resources available for each resource type is assigned a value of 100. Each activity is assigned a resource value for each resource type in proportion to the resources required. The resource values are added for each activity and multiplied by the activity duration. The resulting products are normalized for all activities. The new version will be designated as MACTRES and is the activity duration multiplied by the sum of the scaled resource requirements for that activity and then adding the maximum MACTRES value following that activity.

Each job or activity would have a MACTRES value computed. The PRST algorithm utilizes this MACTRES value to help establish priorities among activities for scheduling purposes.

PRST ALGORITHM

For each job task we compute a priority rule value for each job task in accordance with the equation:

$$PRST = w[x(ACTIM) + (1-x)(MACTRES)] + (1-w)[y(MGRD) + (1-y)(LFT)]$$

where:

w = a variable that is incremented between 0 and 1 in order to conduct an equal interval search of PRST priority rule values for different values of w, x and y.

x = a variable that is incremented between 0 and 1 in order to conduct an equal interval search of PRST priority rule values for different values of w, x and y.

y = a variable that is incremented between 0 and 1 in order to conduct an equal interval search of PRST priority rule values for different values of w, x and y.

ACTIM = critical path time—Late Start Time for each activity

MACTRES = the activity duration multiplied by the sum of the scaled resource requirements for that activity and then adding the maximum MACTRES value following that activity.

MGRD = the sum of the scaled resource requirements for an activity multiplied by the resource type complexity factor for that activity.

LFT = Late Finish Time.

Figure 1B:
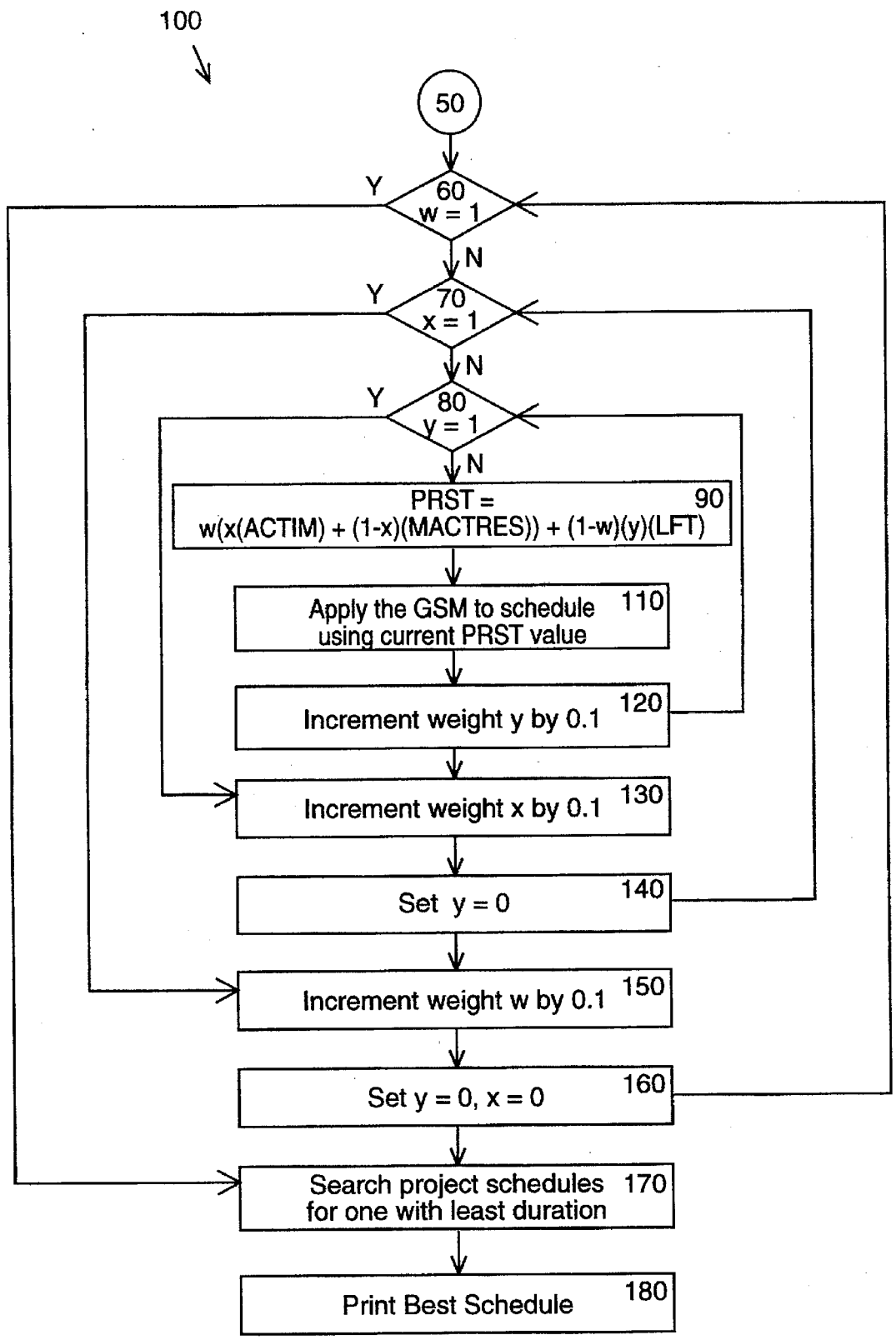
FIG. 1B is the second half of the flow chart on the PRST project scheduling algorithm invention.

FIGS. 1A and 1B are used to run the PRST algorithm. FIG. 1A is the first half of a flowchart 100 on the PRST project scheduling algorithm invention. FIG. 1B is the second half of the flow chart 100 on the PRST project scheduling algorithm invention. In element 10, this step inputs the project network data, and precedence relationships and initializes program variables such as activity duration. In element 20, this step uses the data from step one to calculate the critical path of the network. In element 30, this step uses the project network critical path data and activity resource requirements to calculate the ACTIM, MACTRES, MGRD and LFT priority rule values for each activity. In element 40, this step sets each of the weighting variables for the equal interval search to zero. The variables will later be incremented independently in 0.1 increments until all three variables have a value of 1. Element 50, connects the steps from the page containing FIG. 1A to the page containing FIG. 1B. In element 60, this step checks to see if the w value is 1. The logic here is that if w=1, x and y are also 1 and the search is essentially complete and we transfer to element 170. If w is not 1, we go to element 70. In element 70, this step checks to see if the value of x is 1. If x is 1, we go to element 150, if not we go to element 80. In element 80, this step checks to see if the value of y is 1. If y is 1, we go to element 130, if not, we go to 90. In element 90, this step calculates the PRST priority rule value based on the current value of the variables w, x and y. In element 110, this step schedules the network based on the PRST priority rule values for each activity. In element 120, this step has the y value incremented by 0.1. In element 130, this step the x value is incremented by 0.1, the incremented weight is x by 0.1. In element 140, this step sets the y value to zero. In element 150, in this step the w value is incremented by 0.1. In element 160, this step sets the y and x value to zero. In element 170, this step essentially searches the one thousand project schedules generated for the one with minimum project duration. In element 180, this step prints the best schedule.

Figure 2:
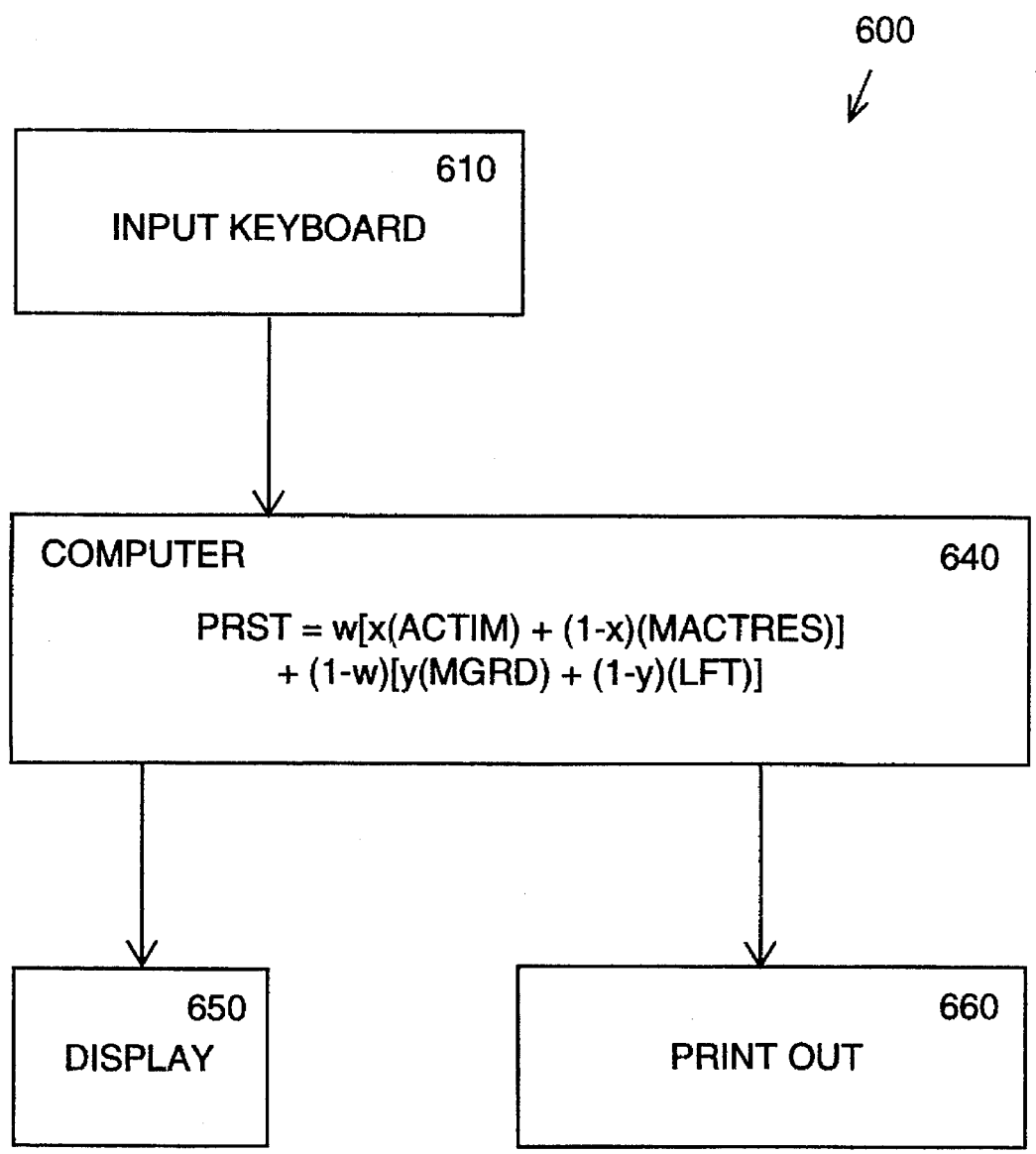
FIG. 2 is a diagram illustration of a computing system on which the algorithm of the present invention can be succesfully utilized.

FIG. 2 is a diagram illustration of a computing system on which the PRST algorithm of the present invention 600 can be successfully utilized. The data input variables for the project to be scheduled above can be entered into the computer 640 through an input device such as a keyboard 610. The computer 640 used to execute the PRST algorithm can be an IBM PC/AT personal computer. A final conflict free schedule can be displayed on a CRT or graphics display 650 and/or printed out on a printer such as a Hewlett Packard Laser Printer and the like. The program embodying the novel PRST algorithm can be written in a conventional programming language such as "C."

Figure 3:
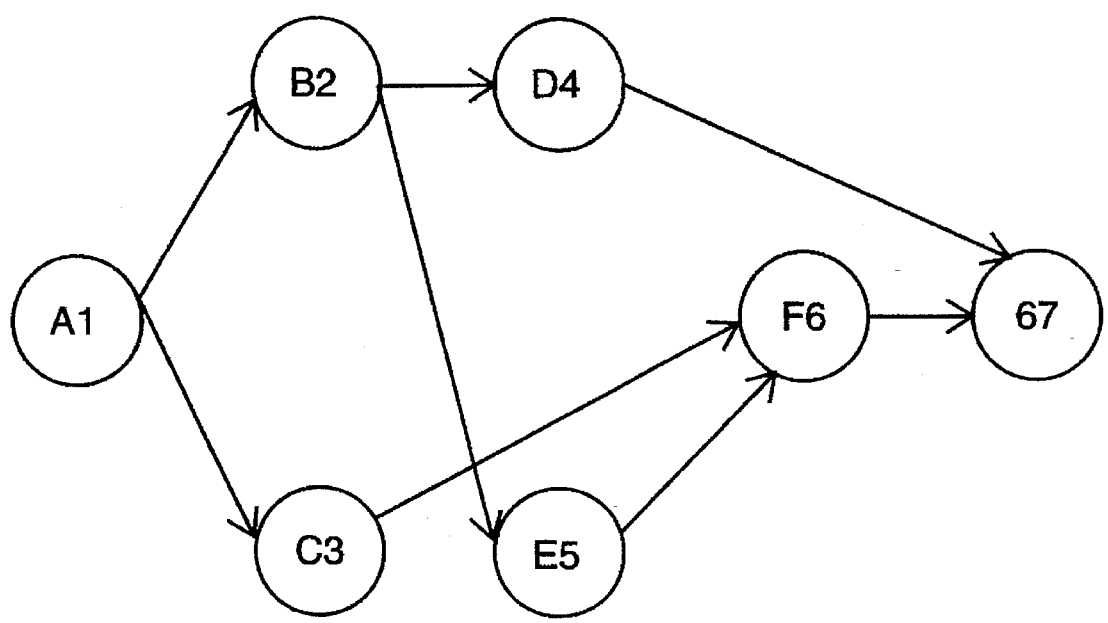
FIG. 3 is an overview of activities/tasks that composes an exemplary project to be scheduled by the subject invention.

The precedence relationship of an example project will be shown in FIG. 3. Referring to FIG. 3, the numbers and letters inside the circles represent each activity and task that composes the project. The term activity and task will be used interchangeably here. For purposes of this example, the FIG. 3 project can be a construction project that includes:

A1 = Dummy Start Task Set to 0,

B2 = Laying the foundation,

C3 = Constructing roof trusses,

D4 = Pouring cement for the driveway,

E5 = Raising the walls,

F6 = Raising the roof, and

G7 = Dummy finish task set to 0.

The arrows coming from an activity indicate the activities that succeed that activity. The arrows going into an activity indicate the activities that precede an activity. The resource requirements for each activity in the project are shown below:

TABLE 1

| Activity Number | Activity Duration | Resource Type 1 | Resource Type 2 | Resource Type 3 |
|---|---|---|---|---|
| A1 | 0 | 0 | 0 | 0 |
| B2 | 1 | 2 | 2 | 1 |
| C3 | 2 | 0 | 2 | 1 |
| D4 | 2 | 3 | 3 | 3 |
| E5 | 3 | 2 | 1 | 3 |
| F6 | 2 | 1 | 1 | 0 |
| G7 | 0 | 0 | 0 | 0 |

The columns of the resource requirements are defined as follows:

Activity Duration = Time requirement amount required to perform an activity/task in a uniform unit amount (i.e., hr., sec. etc.)

Resource Type# is what type of resource is necessary to do the work (i.e., for example: Resource Type 1 can be Trucks, Resource Type 2 can be workers, Resource Type 3 can be money)

In the above table Activity B2 had an Activity Duration of 1 time unit, and required 2 trucks (Resource Type 1), 2 unskilled laborers (Resource Type 2), and 1 craftsman (Resource Type 3).

The activity duration and precedence relationships allow for the application of the critical path method for the unconstrained resource case (unlimited resource availability). The critical path method results in the following values for early start time, late start time and late finish time:

TABLE 2

| Activity Number | Early Start Time | Late Start Time | Late Finish Time |
|---|---|---|---|
| A1 | 0 | 0 | 0 |
| B2 | 0 | 0 | 1 |
| C3 | 0 | 2 | 4 |
| D4 | 1 | 4 | 6 |
| E5 | 1 | 1 | 4 |
| F6 | 4 | 4 | 6 |
| G7 | 6 | 6 | 6 | where: Early Start Time =0 The earliest time you cant start an activity/task.
Late Start Time = The latest time you can start an activity/task.
Late Finish Time = The latest time an activity/task can be finished.

The resource availability (Total Number of particular Resource Type available) for this project is as follows:

| Resource Type 1 | Resource Type 2 | Resource Type 3 |
|---|---|---|
| 5 | 5 | 3 |

(Thus, if Resource Type 1 is trucks, then there are 5 trucks available for the project)

The PRST algorithm can now be computed. PRST is composed of the four priority rules ACTIM, MACTRES, MGRD and LFT. We would first compute the values of these priority rules for each activity in the network.

ACTIM is equivalent to scheduling by LST so the ACTIM values for the network would be equivalent to LST. Once these values are determined they are normalized on a zero to 100 scale so they may be combined effectively via linear weighting. The values for the network are shown in the following table.

TABLE 3

| Activity Number | Late Start Time | Normalized ACTIM (Late Start Time) |
|---|---|---|
| A1 | 0 | 0 |
| B2 | 0 | 0 |
| C3 | 2 | 33 |
| D4 | 4 | 67 |
| E5 | 1 | 17 |
| F6 | 4 | 67 |
| G7 | 6 | 100 |

MACTRES is the activity duration multiplied by the activity resource requirements plus the maximum ACTRES value following that activity. Before the duration can be multiplied by the resource requirements those requirements must be combined. The first step in combining the resource requirements is to normalize them in comparison to the resource availability for that resource type on a zero to 100 scale. For example, if an activity required 5 units of resources of resource type 1 and ten units of resource type 1 were available, it would have a value of 50 for resource type 1. This normalized value would then be summed with the other resource types for the activity. The table below shows these normalizing calculations for resource computation for each activity in the network.

TABLE 4

| Activity Number | Resource Type 1 Required | Resource Type 1 Available | Normalized Resource Type 1 |
|---|---|---|---|
| A1 | 0 | 5 | 0 |
| B2 | 2 | 5 | 40 |
| C3 | 0 | 5 | 0 |
| D4 | 3 | 5 | 60 |
| E5 | 2 | 5 | 40 |
| F6 | 1 | 5 | 20 |
| G7 | 0 | 5 | 0 |

TABLE 5

| Activity Number | Resource Type 2 Required | Resource Type 2 Available | Normalized Resource Type 1 |
|---|---|---|---|
| A1 | 0 | 5 | 0 |
| B2 | 2 | 5 | 40 |
| C3 | 2 | 5 | 40 |
| D4 | 3 | 5 | 60 |
| E5 | 1 | 5 | 20 |
| F6 | 1 | 5 | 20 |
| G7 | 0 | 5 | 0 |

TABLE 6

| Activity Number | Resource Type 3 Required | Resource Type 3 Available | Normalized Resource Type 3 |
|---|---|---|---|
| A1 | 0 | 3 | 0 |
| B2 | 1 | 3 | 30 |
| C3 | 1 | 3 | 30 |
| D4 | 3 | 3 | 100 |
| E5 | 3 | 3 | 100 |
| F6 | 0 | 3 | 0 |
| G7 | 0 | 3 | 0 |

TABLE 7

| Activity Number | Normalized Resource Type 1 | Normalized Resource Type 1 | Normalized Resource Type 3 | Summed Resource Value |
|---|---|---|---|---|
| A1 | 0 | 0 | 0 | 0 |
| B2 | 40 | 40 | 30 | 110 |
| C3 | 0 | 40 | 30 | 70 |
| D4 | 60 | 60 | 100 | 220 |
| E5 | 40 | 20 | 100 | 160 |
| F6 | 20 | 20 | 0 | 40 |
| G7 | 0 | 0 | 0 | 0 |

The summed resource values are now multiplied by the activity duration for each activity. The results are in the table below.

TABLE 8

| Activity Number | Activity Duration | Summed Resource Value | Resources Multiplied by Duration |
|---|---|---|---|
| A1 | 0 | 0.0 | 0.0 |
| B2 | 1 | 1.1 | 1.1 |
| C3 | 2 | 0.7 | 1.4 |
| D4 | 2 | 2.2 | 4.4 |
| E5 | 3 | 1.6 | 4.8 |

TABLE 8-continued

| Activity Number | Activity Duration | Summed Resource Value | Resources Multiplied by Duration |
|---|---|---|---|
| F6 | 2 | 0.4 | 0.8 |
| G7 | 0 | 0.0 | 0.0 |

We now add the resources multiplied by duration to the largest resources multiplied by duration of all activities successors in the network and then normalize these activities for the final MACTRES values for each activity as shown in the able below.

TABLE 9

| Activity Number | Resources Multiplied By Duration | Largest Following Value | Raw MACTRES Value | Normalized MACTRES Value |
|---|---|---|---|---|
| A1 | 0.0 | 6.7 | 6.7 | 100 |
| B2 | 1.1 | 5.6 | 6.7 | 100 |
| C3 | 1.4 | 0.8 | 2.2 | 33 |
| D4 | 4.4 | 0 | 4.4 | 66 |
| E5 | 4.8 | 0.8 | 5.6 | 84 |
| F6 | 0.8 | 0 | 0.8 | 12 |
| G7 | 0.0 | 0 | 0.0 | 0 |

MGRD is the greatest resource demand heuristic. It is computed by using the summed resources taken from table 8 and multiplying those factors by a resource type complexity factor that provides increased priority to activities that require more different types of resources.

TABLE 10

| Activity Number | Summed Resource Value | Number of Resource Types | After Application of Resource Type Complexity Factor | Normalized MGRD Value |
|---|---|---|---|---|
| A1 | 0 | 0 | 0 | 0 |
| B2 | 110 | 3 | 119 | 50 |
| C3 | 70 | 2 | 73 | 31 |
| D4 | 220 | 3 | 238 | 100 |
| E5 | 160 | 3 | 173 | 73 |
| F6 | 40 | 2 | 42 | 18 |
| G7 | 0 | 0 | 0 | 0 |

LFT values were determined through application of the critical path method. These values just need to be normalized so they can be effectively combined via linear weighting.

TABLE 11

| Activity Number | Late Finish Time | Normalized LFT |
|---|---|---|
| A1 | 0 | 0 |
| B2 | 1 | 17 |
| C3 | 4 | 67 |
| D4 | 6 | 100 |
| E5 | 4 | 67 |
| F6 | 6 | 100 |
| G7 | 6 | 100 |

We have now obtained all of the priority rule values which are shown in the table below.

TABLE 12

| Activity Number | Normalized ACTM Value | Normalized MACTRES Value | Normalized MGRD Value | Normalized LFT Value |
|---|---|---|---|---|
| A1 | 0 | 100 | 0 | 0 |
| B2 | 0 | 100 | 50 | 17 |
| C3 | 33 | 33 | 31 | 67 |
| D4 | 67 | 66 | 100 | 100 |
| E5 | 17 | 84 | 73 | 67 |
| F6 | 67 | 12 | 18 | 100 |
| G7 | 100 | 0 | 0 | 100 |

We can now use the PRST algorithm and begin the equal interval search technique. As you recall, PRST is defined as follows:

$$PRST=w[x(ACTIM)+(1-x)(MACTRES)]+(1-w)[y(MGRD)+(1-y)(LFT)]$$

The equal interval search technique is implemented by setting the values of w, x, and y equal to zero and stepping through in 0.1 increments from 0 to 1. At each increment a schedule is generated and the schedule length is determined. The schedule with the lowest length is then used as the basis for determining activity sequence. For example with w=0.8, x=0.2, and y=0.5, PRST would be computed for each activity. Activity 3's PRST value would be computed as follows:

$$PRST=0.8[0.2(ACTIM)+(1-0.2)(MACTRES)]+[1-0.8][0.5(MGRD)+(1-.05)(LFT)]$$

substituting in the priority rule values for activity 3.

$$PRST=0.8[0.2(33)+(1-0.2)(33)]+[1-0.8][0.5(31)+(1-0.5)(67)]$$

PRST=36

This raw value of PRST would then be normalized on a 0 to 100 scale along with all the other PRST values for the other activities. The activities would then be scheduled in PRST order as their early start time permits. (This means the precedence relationship of the project cannot be violated, i.e., you cannot put the roof of the house up before you install the walls).

With an increment value of 0.1, 1000 schedules would be generated. The shortest schedule would then be outputted with the sequence including start and finish times for each activity.

| Activity Number | PRST Start Time | PRST Finish Time |
|---|---|---|
| A1 | 0 | 0 |
| B2 | 0 | 1 |
| C3 | 0 | 1 |
| D4 | 5 | 5 |
| E5 | 5 | 7 |
| F6 | 2 | 7 |
| G7 | 7 | 7 |

Note the finish time of the last activity is the finish time of the project In this case, the finish time is 7 time units. This happens to be the optimal (best achievable) finish time for this particular problem. The optimal solution for this problem can be computed because of its small size.

While the preferred embodiment describes ranking priority values based on the novel PRST algorithm, the invention can generate a project schedule based on other priority values. The calculations separately determined by computing MACTRES values or MGRD values can also be ranked to determine a project schedule of the job tasks and activities.

Utilizing a computer system of this type, the jobs or tasks that compose a project can be scheduled in a matter of minutes. The schedule would show the sequence and start and finish times for each activity.

The invention has utility as a Commercial Off The Shelf (COTS) Project software by itself or as an add-on to existing software packages such as Microsoft Project 22B or Artemis.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of scheduling job tasks and activities of construction, manufacturing, research, and development projects to minimize overall duration time of the projects, comprising the steps of:

(a) identifying all job tasks of a project to be scheduled, wherein the project is chosen from at least one of: a construction project, manufacturing project, research project and development project;

(b) identifying all resources available for the project to be scheduled;

(c) identifying time values for completing each task for the project to be scheduled;

(d) computing a priority index value for each job task in accordance with the equation:

$$PRST = w[x(ACTIM) + (1-x)(MACTRES)] + [1-w][y(MGRD) + (1-y)(LFT)]$$

where:

w is a variable incremented between 0 and 1, x is a variable incremented between 0 and 1, ACTIM is critical path time minus late start time for each task, MACTRES is the task duration multiplied by the sum of the scaled resource requirements for the task, plus addition of maximum MACTRES value following the task, MGRD is sum of scaled resource requirements for the activity multiplied by resource type complexity factor of the task, LFT is the latest finish time to complete the task; and (e) providing a schedule of job tasks based on the priority index values for each task, wherein the all job tasks for the project are in one schedule which minimizes the duration time to complete the project.

2. The method of scheduling job tasks and activities of construction and manufacturing projects of claim 1, wherein the project to be scheduled includes:

multiple projects.

3. The method of scheduling job tasks and activities of construction and manufacturing projects of claim 1, wherein the resources include:

multiple resources.

4. A method of scheduling job tasks and activities of construction and manufacturing projects having multiple job tasks and multiple resources in order to minimize overall duration time of the project, comprising the steps of:

(a) determining all individual job tasks required for a project;

(b) determining all resources necessary to compete each job task;

(c) calculating time duration of each job task;

(d) calculating latest time each job task can be started;

(e) calculating latest time each job task can be finished;

(f) determining priority rule values for each job task based on the resources, the time duration, the latest start time and the latest finish time of each job task;

(g) ranking the job tasks in order of each of the priority rule values; and (h) scheduling the job tasks based on the ranking of the job tasks, wherein duration time to complete the projects is minimized.

5. The method of scheduling job tasks and activities of claim 4, wherein the job tasks include:

activities of the project.

6. The method of scheduling job tasks and activities of claim 4, further comprising:

calculating an ACTIM value for each job task, where the ACTIM value is critical path time minus late start time for each task.

7. The method of scheduling job tasks and activities of claim 6, further comprising:

calculating a MACTRES value for each job task, where the MACTRES value is the task duration multiplied by the sum of the scaled resource requirements for the task, plus addition of maximum value following the task.

8. The method of scheduling job tasks and activities of claim 7, further comprising:

calculating a MGRD value for each job task, where the MGRD value is sum of scaled resource requirements for the activity multiplied by resource type complexity factor of the task.

9. The method of scheduling job tasks and activities of claim 8, wherein step (f) of determining the priority rule values further includes:

computing a priority index value for each job task in accordance with the equation:

$$PRST = w[x(ACTM) + (1-x)(MACTRES)] + (1-w)[y(MGRD) + (1-y)(LFT)]$$

where:

w is a variable incremented between 0 and 1, x is variable incremented between 0 and 1, and y is variable incremented between 0 and 1.

10. A method of scheduling job tasks and activities of construction and manufacturing projects having multiple job tasks and multiple resources in order to minimize overall time duration to complete the projects, comprising the steps of:

(a) determining each job task and each activity to be required for a project;

(b) determining all resources necessary to complete each job task and each activity;

(c) calculating time duration of each job task and each activity;

(d) calculating latest time each job task and each activity can be started;

(e) calculating latest time each job task and each activity can be finished;

(f) determining a priority rule value for each job task and each activity based on the resources, the time duration, the latest start time and the latest finish time;

(g) ranking the job tasks in order of each of the priority rule values; and (h) scheduling the job tasks based on the ranking of the job tasks, wherein time duration to complete the project has been minimized.

11. The method of scheduling job tasks and activities of construction and manufacturing projects of claim 10, wherein step (f) includes:

calculating a MACTRES value for each job task, where the MACTRES value is the task duration multiplied by the sum of the scaled resource requirements for the task, plus addition of maximum value following the task.

12. The method of scheduling job tasks and activities of construction and manufacturing projects of claim 10, wherein step (f) includes:

calculating a MGRD value for each job task, where the MGRD value is sum of scaled resource requirements for the activity multiplied by resource type complexity factor of the task.

* * * * *